(12) United States Patent
Koch

(10) Patent No.: US 10,345,537 B2
(45) Date of Patent: Jul. 9, 2019

(54) PLUG PART AND PLUG-IN CONNECTION

(71) Applicant: NEUTRIK AG, Schaan (LI)

(72) Inventor: Matthias Koch, Gotzis (AT)

(73) Assignee: NEUTRIK AG, Schaan (LI)

(*) Notice: Subject to any disclaimer, the term of this patent is extended or adjusted under 35 U.S.C. 154(b) by 52 days.

(21) Appl. No.: 15/066,307

(22) Filed: Mar. 10, 2016

(65) Prior Publication Data
US 2016/0274315 A1 Sep. 22, 2016

(30) Foreign Application Priority Data

Mar. 18, 2015 (DE) .................. 20 2015 101 396 U

(51) Int. Cl.
G02B 6/38 (2006.01)
H01R 13/44 (2006.01)
H01R 13/453 (2006.01)

(52) U.S. Cl.
CPC ......... *G02B 6/3893* (2013.01); *G02B 6/3849* (2013.01); *H01R 13/44* (2013.01); *H01R 13/4536* (2013.01); *G02B 6/3874* (2013.01)

(58) Field of Classification Search
CPC .. G02B 6/3849; G02B 6/3893; G02B 6/4297; G02B 6/3839; G02B 6/3885
See application file for complete search history.

(56) References Cited

U.S. PATENT DOCUMENTS

| 4,176,897 A | 12/1979 | Cameron |
| 5,716,224 A | 2/1998 | Masuda et al. |
| 6,004,147 A | 12/1999 | Don-Yehiya |
| 6,079,881 A | 6/2000 | Roth |
| 7,857,524 B2 | 12/2010 | Dobler |
| 8,708,574 B2 | 4/2014 | Wang et al. |

(Continued)

FOREIGN PATENT DOCUMENTS

| CN | 201015157 Y | 1/2008 |
| CN | 102116909 A | 7/2011 |

(Continued)

Primary Examiner — Ryan A Lepisto
Assistant Examiner — Erin D Chiem
(74) Attorney, Agent, or Firm — Volpe and Koenig, P.C.

(57) ABSTRACT

Plug part (1) for establishing an optical and/or electrical plug-in connection (2) with a mating plug part (3) by plugging together the plug part (1) with the mating plug part (3) in at least one plugging-together direction (4), the plug part (1) having a plug part housing (5) and at least one optical and/or electrical contact (6) and an elastic opening prestressing element (7), acting in a direction parallel to the plugging-together direction (4), and an opening element (8) for opening a flap (9) on the mating plug part (3), the opening element (8) being mounted displaceably in relation to the plug part housing (5) in directions parallel to the plugging-together direction (4) in or on the plug part housing (5), and being prestressed in one of these directions parallel to the plugging-together direction (4) by the opening prestressing element (7), wherein the opening element (8) is formed as a one-piece body and has a first abutting face (10) for the opening prestressing element (7) and a second abutting face (11) for the opening of the flap (9) of the mating plug part (3).

14 Claims, 2 Drawing Sheets

(56) References Cited

U.S. PATENT DOCUMENTS

2010/0014812 A1\* 1/2010 Dobler ................ G02B 6/3849
  385/70
2012/0301081 A1 11/2012 Affre De Saint Rome et al.
2014/0294348 A1 10/2014 Ishiguro

FOREIGN PATENT DOCUMENTS

DE  102013105777  12/2014
EP      2146232   1/2010

\* cited by examiner

PLUG PART AND PLUG-IN CONNECTION

INCORPORATION BY REFERENCE

The following documents are incorporated herein by reference as if fully set forth: German Patent application No. DE 202015101396.5, filed Mar. 18, 2015.

BACKGROUND

The present invention relates to a plug part for establishing an optical and/or electrical plug-in connection with a mating plug part by plugging together the plug part with the mating plug part in at least one plugging-together direction, the plug part having a plug part housing and at least one optical and/or electrical contact and an elastic opening prestressing element, acting in a direction parallel to the plugging-together direction, and an opening element for opening a flap on the mating plug part, the opening element being mounted displaceably in relation to the plug part housing in directions parallel to the plugging-together direction in or on the plug part housing, and being prestressed in one of these directions parallel to the plugging-together direction by the opening prestressing element.

Many configurations of plug parts for establishing optical and/or electrical plug-in connections are known. Not only optical and/or electrical signals but also power can be transmitted by way of the optical and/or electrical plug-in connections. In the case of more sensitive contacts, it is already known in the prior art to protect them from external influences in the unplugged state of the plug part and the mating plug part by a flap. As an example, reference is made here to EP 2 146 232 A1. In this document, both the plug part and the mating plug part each have a flap protecting the contacts, which is only opened during the plugging together of the plug part and the mating plug part.

SUMMARY

The object of the invention is to configure the opening element that serves for opening the flap in the mating plug part to be as simple as possible and nevertheless operationally reliable.

For this purpose, the invention provides in the case of a plug part of the aforementioned type that the opening element is formed as a one-piece body and has a first abutting face for the opening prestressing element and a second abutting face for the opening of the flap of the mating plug part.

Consequently, by contrast with the aforementioned prior art, the opening element is formed very simply as a one-piece, preferably intrinsically rigid body. It has a first abutting face for the opening prestressing element and a second abutting face for the opening of the flap of the mating plug part.

The opening element may be of a very simple design. It may for example be a pin-like slide or the like. In the sense of simplest possible but also operationally reliable guidance of the opening element during the displacing of the opening element seen in the direction parallel to the plugging-together direction, preferred embodiments provide that the opening element is formed as an annular element with a central opening for passing through the optical and/or electrical contact. The opening plane of the central opening in the opening element is favorably aligned permanently normal to the plugging-together direction.

In order to ensure that the opening element is not pushed out of the plug part housing by the opening prestressing element, a counter stop which keeps the opening element in the plug part housing is favorably provided on the plug part housing. In this sense, preferred configurations of the invention provide that the opening element has a stop face for stopping against at least one counter stop on the plug part housing.

In the sense of the plug part being easy to produce, particularly preferred variants provide that the plug part has at least one or the counter stop, against which the opening element stops, is initially produced as a separate part and is fixed as such on the plug part housing. This is especially appropriate whenever the plug part housing is produced by injection molding. In the case of injection molding, it is favorable to have to allow for the fewest possible undercuts. The fact that the counter stop is initially produced as a separate part makes it possible to produce the plug part housing by injection molding initially without the counter stop, which facilitates the final molding of the injection-molded plug part housing. Only after that is the counter stop, produced as a separate part, fixed to the plug part housing. This fixing may be performed for example by bonding in place, welding, pressing or the like. In preferred configurations, the counter stop is also formed as an annular element with a central opening for passing through the optical and/or electrical contact.

A wide variety of springs, elastomer bodies or the like may be used as the elastic opening prestressing element. Preferred configurations of the invention provide that the elastic opening prestressing element is formed as a helical spring that can be compressed in a direction parallel to the plugging-together direction, and/or the optical and/or electrical contact is arranged in an interior space surrounded by the elastic opening prestressing element. In preferred configurations, the optical and/or electrical contacts of the plug part are grouped together in a contact carrier. This contact carrier can also be referred to as a ferrule. In preferred variants, the contact carrier is also located in the interior space surrounded by the elastic opening prestressing element.

As already indicated above, the invention relates not only to the plug part according to the invention itself but also to a plug-in connection with a plug part according to the invention and a mating plug part, the mating plug part having at least one flap and the opening element of the plug part with its second abutting face opening the flap of the mating plug part during the plugging together of the plug part with the mating plug part.

In order to ensure that the optical and/or electrical contact of the plug part is/are not damaged during this plugging-in or opening operation, preferred variants provide that the opening element of the plug part with its second abutting face opens the flap before the optical and/or electrical contact of the plug part comes up against the flap. This can be ensured by making the corresponding geometries of the components involved match in a wide variety of variants.

In principle, it should be pointed out that, according to the invention, each plug part and also mating plug part may have only one or else a number of optical and/or electrical contacts. If reference is made here to the optical and/or electrical contact, this serves only as a linguistic simplification.

In order that the opening element opens the flap before it is displaced in the plug part housing, preferred variants of the plug-in connection provide that the flap is prestressed in the direction of its closed position by at least one elastic flap prestressing element, the prestressing force that is exerted by the elastic opening prestressing element on the opening element being greater than the force that is required for opening the flap, at least in the direction parallel to the plugging-together direction. It is also favorably provided that the mating plug part has at least two housing parts mounted displaceably in relation to one another in directions parallel to the plugging-together direction, one of the housing parts having at least one actuating element for opening the flap and the opening element displacing this housing part in relation to the other housing part with the actuating element during the plugging together of the plug part and the mating plug part for opening the flap.

BRIEF DESCRIPTION OF THE DRAWINGS

Further features and details of a preferred exemplary embodiment of the invention are set out below in the description of the figures, in which.

DETAILED DESCRIPTION OF THE PREFERRED EMBODIMENTS

Figure 1:
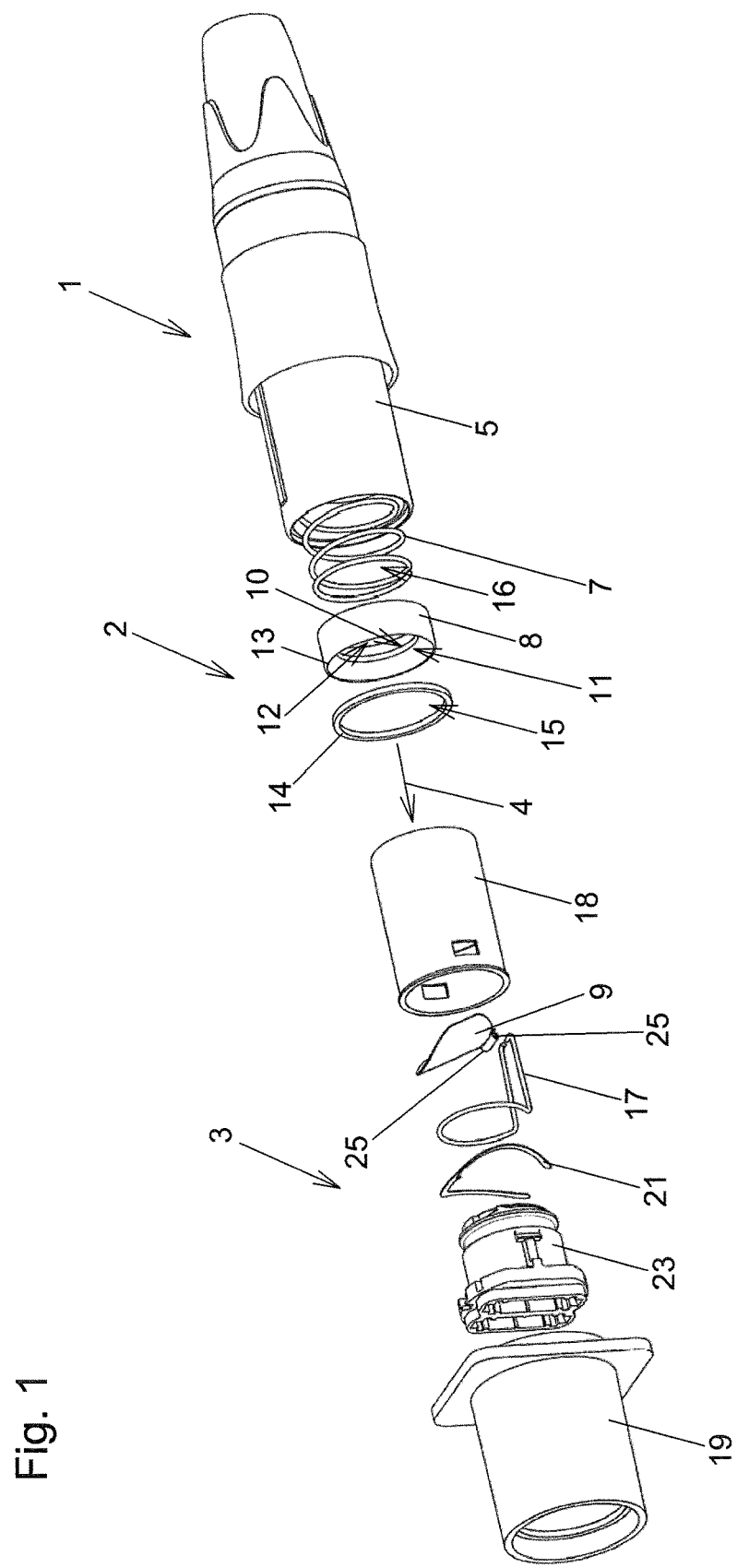
FIG. 1 shows an exploded representation of a plug-in connection formed according to the invention.

In the exploded representation according to FIG. 1, both the plug part 1 and the mating plug part 3 of the plug-in connection 2 are represented. In addition to the plug part housing 5, the plug part 1 also has inter alia the opening prestressing element 7, the opening element 8, formed here in an annular manner, and the counter stop 14, likewise formed here in an annular manner. The opening element 8 comprises a central opening 12 through which the contacts 6 of the plug part 1 that cannot be seen in FIG. 1 can be passed. The opening element 8 is supported with its first abutting face 10 on the elastic opening prestressing element 7, formed here as a helical spring. The second abutting face 11 of the opening element 8 serves for actuating and opening the flap 9, as explained in detail further below. With the stop face 13, the opening element 8 stops against the counter stop 14 in such a way that it cannot be pushed out of the housing 5 by the opening prestressing element 7.

The central opening 15 in the annular counter stop 14, through which the optical and/or electrical contacts 6 of the plug part 1 can likewise be passed, can also be seen well in FIG. 1. The plugging-together direction 4, in which the plug part 1 can be pushed into the mating plug part 3 during the plugging together, is also depicted in FIG. 1.

The mating plug part 3 that is likewise shown in FIG. 1 in one of the exploded representations is substantially modeled on the corresponding mating plug part shown in EP 2 146 232 A1. It has two housing parts 18 and 19, which are displaceable in relation to one another parallel to the plugging-together direction 4. Fixedly mounted in the housing part 19 is the mating contact carrier 23, which carries the optical and/or electrical mating contacts 24 of this mating plug part 3. Acting between the housing part 18 and the housing part 19 is the further prestressing element 21, formed here as a leaf spring. The flap prestressing element 17, both carrying the flap 9 of the mating plug part 3 and prestressing it in the direction of the closed position, is supported on the mating contact carrier 23. It acts via the beveled surfaces 25 on the flap 9 on this flap 9, as shown and described in detail in EP 2 146 232 A1, in particular on the basis of FIGS. 6 to 10.

The operations involved in the plugging together of the plug-in connection 2 when the plug part 1 is inserted into the mating plug part 3 in the plugging-together direction 4 are now explained on the basis of FIGS. 2 to 5, which each show a longitudinal section through the plug part 1 and through the mating plug part 3.

Figure 2:
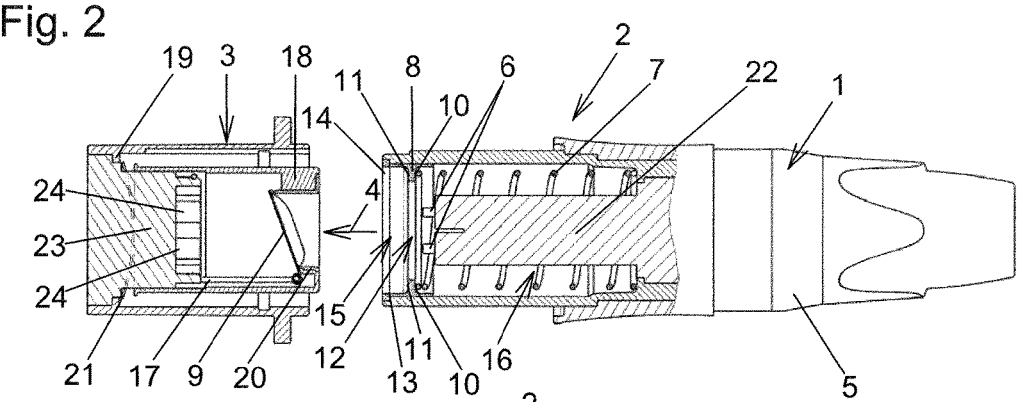
FIGS. 2 to 5 show a sequence of longitudinal sections through this plug-in connection in various positions before, during and at the end of the operation of plugging together the plug part and the mating plug part.

FIG. 2 shows in a longitudinal section the situation shortly before the plug part 1 is pushed into the mating plug part 3 in the plugging-together direction 4. In the mating plug part 3, the flap 9 is in its closed position. In the plug part 1, the opening element 8 has been pushed by the opening prestressing element 7, formed here as a helical spring, so far forward that it lies with its stop face 13 against the counter stop 14 formed in an annular manner. The counter stop 14 is produced as a separate component and has been inserted into the plug part housing 5 and fixed there. The opening prestressing element 7 presses against the first abutting face 10 of the plug part 1. The contact carrier 22 with the contacts 6 of the plug part 1 is located in the interior space 16 of the opening prestressing element 7.

Figure 3:
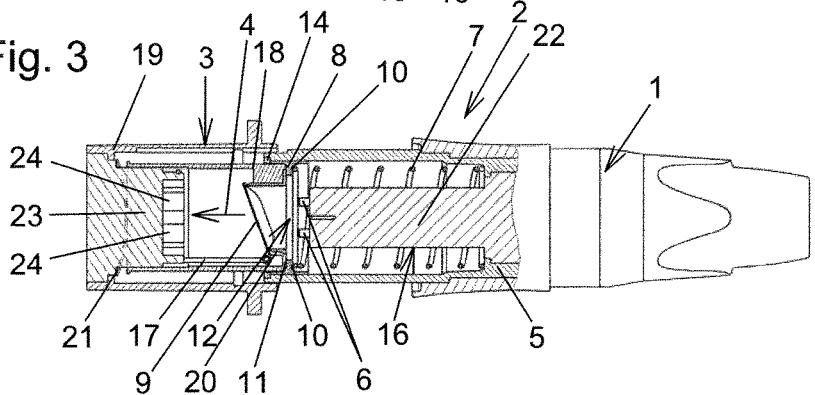
Figure 4:
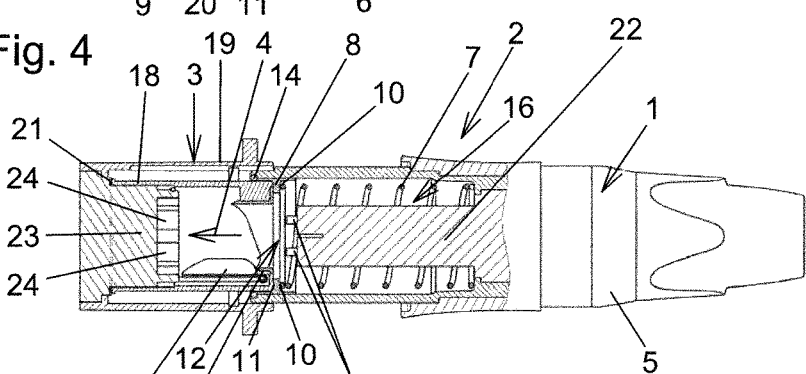

If the plug part 1 is then pushed into the mating plug part 3 in the plugging-together direction 4, the second abutting face 11 of the opening element 8 comes into contact with the housing part 18 of the plug part 1. This is represented in FIG. 3. If pressure is then exerted further on the plug part 1 in the plugging-together direction 4, this leads to the opening of the flap 9, as can be seen in FIG. 4. In preferred embodiments such as the one shown here, it is provided for this that the prestress or force exerted by the elastic prestressing element 7 on the opening element 8 is greater than the forces required for opening the flap 9. In the exemplary embodiment shown here, these forces are produced on the one hand by the further prestressing element 21 and on the other hand by the flap prestressing element 17. In the case of the variant shown here, it is the case that the opening element 8, supported by the opening prestressing element 7, initially presses the housing part 18 in the direction of the housing part 19 of the mating plug part 3, in the plugging-together direction 4, whereby the further prestressing element 21, formed here as a leaf spring, is deformed. This can be clearly seen in the comparison of FIG. 3 and FIG. 4. The pushing of the housing part 18 into the housing part 19 has the effect that the actuating element 20 arranged fixedly on the housing part 18 presses against the flap 9, whereby the latter is opened against the prestressing of the flap prestressing element 17, whereby the position according to FIG. 4 is reached.

Figure 5:
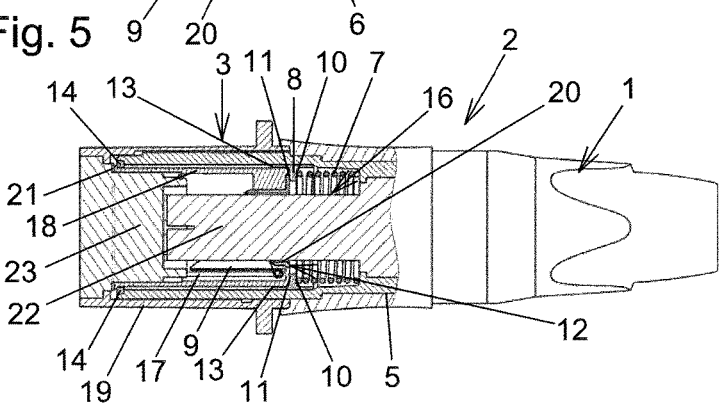

Only when the housing part 18 cannot be displaced any more against the housing part 19 in the plugging-together direction 4 does a further pushing in of the plug part 1 into the mating plug part 13 in the plugging-together direction 4 then lead to the opening prestressing element 7 being compressed counter to its elastic prestressing, the opening element 8 being pushed into the plug housing part 5 counter to the plugging-together direction 4, until the position represented in FIG. 5 is reached. In this position, the plug part 1 has been pushed completely into the mating plug part 3 and the optical and/or electrical contacts 6 of the plug part 1 have been brought into electrically and/or optically conducting connection with the mating contacts 24 of the mating plug part 3. A locking of the plug part 1 and the mating plug part 2 in the completely plugged-together position shown in FIG. 5 can take place as in the prior art.

It may be for example a locking that can be released by means of a pushbutton or the like. This is not shown separately here.

If the plug part 1 is then pulled out of the mating plug part 3 counter to the plugging-together direction 4, the unplugging operation proceeds in a way corresponding to a sequence of FIGS. 5, 4, 3 and 2, which does not have to be explained in detail again. It is in any event the case that, during the pulling out, starting from FIG. 5, the opening prestressing element 7 initially pushes the opening element 8 back in the direction of the counter stop 14. Only when the opening element 8 lies with its stop face 13 against the counter stop 14 again (cf. FIG. 4) and the plug part 1 is then pulled out further from the mating plug part 3 counter to the plugging-together direction 4, can the further prestressing element 21 push the housing part 18 out of the housing part 19 of the mating plug part 3 again counter to the plugging-together direction 4. Then the actuating element 20 releases the flap 9 and the flap prestressing element 17 can close the flap 9 again, as is shown in FIG. 3.

In the exemplary embodiment shown, it is therefore the case in the plugging-in operation that the opening element 8 of the plug part 1 opens the flap 9 with its second abutting face 11 before the optical and/or electrical contact 6 of the plug part 1 comes up against the flap 9.

KEY TO THE REFERENCE NUMERALS 1 plug part
2 plug-in connection
3 mating plug part
4 plugging-together direction
5 plug part housing
6 contact
7 opening prestressing element
8 opening element
9 flap
10 first abutting face
11 second abutting face
12 central opening
13 stop face
14 counter stop
15 central opening
16 interior space
17 flap prestressing element
18 housing part
19 housing part
20 actuating element
21 further prestressing element
22 contact carrier
23 mating contact carrier
24 mating contact
25 beveled surface

The invention claimed is:

1. A plug part for establishing at least one of an optical or electrical plug-in connection with a mating plug part by plugging together the plug part with the mating plug part in a plugging-together direction, the plug part comprising a plug part housing, at least one optical or electrical contact, an elastic opening prestressing element that acts in a direction parallel to the plugging-together direction, an opening element adapted to open a flap pivotably hinged at one outer flap edge to the mating plug part, the opening element being mounted displaceably in relation to the plug part housing in directions parallel to the plugging-together direction in or on the plug part housing, and being prestressed in one of said directions parallel to the plugging-together direction by the opening prestressing element, the opening element is formed as a one-piece body and has a first abutting face contacting the opening prestressing element and a second abutting face that is adapted to open the flap of the mating plug part.

2. The plug part according to claim 1, wherein the opening element is formed as an annular element with a central opening through which the at least one of the optical or electrical contact passes.

3. The plug part according to claim 1, wherein the opening element has a stop face for stopping against at least one counter stop on the plug part housing.

4. The plug part according to claim 1, further comprising at least one counter stop against which the opening element stops, the counter stop being a separate part that is fixed on the plug part housing.

5. The plug part according to claim 4, wherein the counter stop is formed as an annular element with a central opening through which the at least one of the optical or electrical contact passes.

6. The plug part according to claim 1, wherein the elastic opening prestressing element is formed as a helical spring that is compressible in a direction parallel to the plugging-together direction.

7. The plug part according to claim 1, wherein the at least one of the optical or electrical contact is arranged in an interior space of the plug part housing surrounded by the elastic opening prestressing element.

8. A plug-in connection comprising the plug part according to claim 1 and a mating plug part, the mating plug part having the flap having the pivotably hinged connection at one outer flap edge to the mating plug part, and the opening element of the plug part with the second abutting face thereof opens the flap of the mating plug part as the plug part is plugged together with the mating plug part.

9. The plug-in connection according to claim 8, wherein the opening element of the plug part with the second abutting face thereof opens the flap prior to the at least one of the optical or electrical contact of the plug part coming up against the flap as the plug part is plugged together with the mating plug part.

10. The plug-in connection according to claim 8, wherein the flap is prestressed in a direction of a closed position by at least one elastic flap prestressing element, and a prestressing force that is exerted by the elastic opening prestressing element on the opening element is greater than a force that is required for opening the flap, at least in the direction parallel to the plugging-together direction.

11. The plug-in connection according to claim 8, wherein the mating plug part comprises at least two housing parts mounted displaceably in relation to one another in directions parallel to the plugging-in direction, a first one of the housing parts having at least one actuating element for opening the flap, and the opening element displaces the first one of the housing parts in relation to the other housing part with the actuating element during the plugging together of the plug part and the mating plug part for opening the flap.

12. The plug-in connection according to claim 8, wherein the flap is movable about the pivotably hinged connection in the plugging-together direction from a closed position to an open position.

13. The plug-in connection according to claim 12, wherein the flap includes a flap body that, in the closed position, is arranged tilted from the pivotably hinged connection in the plugging-together direction.

14. The plug part according to claim 1, wherein the opening prestressing element is supported on the plug part housing at a first end of the opening prestressing element opposite from a second end of the opening prestressing element abutting the first abutting face of the opening element.

* * * * *